US005478442A

United States Patent [19]

Orac

[11] Patent Number: 5,478,442

[45] Date of Patent: Dec. 26, 1995

[54] TREATMENT OF PETROLEUM COKES WITH A PUFFING INHIBITOR IN A ROTARY CALCINER

[75] Inventor: Thomas H. Orac, Strongsville, Ohio

[73] Assignee: UCAR Carbon Technology Corporation, Danbury, Conn.

[21] Appl. No.: 390,922

[22] Filed: Feb. 15, 1995

Related U.S. Application Data

[63] Continuation of Ser. No. 225,436, Apr. 8, 1994, abandoned, which is a continuation of Ser. No. 989,944, Dec. 10, 1992, abandoned, which is a continuation of Ser. No. 829,554, Feb. 5, 1992, abandoned, which is a continuation of Ser. No. 627,833, Dec. 17, 1990, abandoned.

[51] Int. Cl.[6] .......... C01B 31/04; C10B 57/00

[52] U.S. Cl. .......... 201/17; 201/20; 201/32; 196/112; 202/100; 202/103; 202/216; 202/262; 423/448; 423/449.8; 432/153

[58] Field of Search .......... 201/17, 20, 32; 202/100, 103, 216, 262; 432/153; 423/448, 449.8, 46; 196/112

[56] References Cited

U.S. PATENT DOCUMENTS

| | | | |
|---|---|---|---|
| 2,814,076 | 11/1957 | Gartland | 423/449 |
| 3,506,745 | 4/1970 | Juel et al. | 264/29.5 |
| 3,594,287 | 7/1971 | Allred | 202/103 |
| 3,642,962 | 2/1972 | Wallouch | 201/17 |
| 3,763,013 | 10/1973 | Allred | 202/103 |
| 4,312,745 | 1/1982 | Hsu | 201/20 |
| 4,875,979 | 10/1989 | Orac et al. | 201/5 |
| 5,110,359 | 5/1992 | Orac et al. | 423/448 |
| 5,118,287 | 6/1992 | Orac et al. | 432/106 |

FOREIGN PATENT DOCUMENTS

| | | |
|---|---|---|
| 120273 | 8/1970 | United Kingdom . |
| 1202739 | 8/1970 | United Kingdom . |

OTHER PUBLICATIONS

Mellors Comprehensive Treatise on Inorganic and Theoretical Chemistry, 1961, vol. II, Supplement II, pp. 324, 325 & 1149.

Industrial and Engineering Chemistry by D. A. Fox et al., vol. 23, No. 3, Mar. 1931, pp. 259–266 "Effect of Sodium Carbonate Upon Gasification of Carbon and Production of Producer Gas".

*Primary Examiner*—Wilbur Bascomb, Jr.
*Attorney, Agent, or Firm*—F. J. McCarthy

[57] ABSTRACT

A rotary hearth calciner for treating petroleum cokes with a puffing inhibitor has a horizontal or inwardly sloping hearth floor rotatable around a vertical axis for receiving particles of coke to be calcined and a central opening in the hearth floor for discharging the coke into a soaking pit. A water cooled, refractory covered feed pipe extending downward into the calciner interior has an inlet for connection to a source of petroleum coke puffing inhibitor and an outlet near the edge of the hearth central floor opening for adding the puffing inhibitor to the coke as the coke is discharged from said hearth floor. The feed pipe outlet is approximately at or below the level of the hearth floor to reduce loss of inhibitor in gas flow above the hearth floor. A puffing inhibitor such as sodium carbonate is supplied by a screw feed mechanism to the feed pipe to add the puffing inhibitor at a desired rate for reaction with the coke. The coke is normally maintained in the soaking pit for about 30 minutes at 1200°–1400° C.

1 Claim, 2 Drawing Sheets

TREATMENT OF PETROLEUM COKES WITH A PUFFING INHIBITOR IN A ROTARY CALCINER

This application is a continuation of prior U.S. application Ser. No.: 08/225,436 filed Apr. 8, 1994 and/which is a continuation of application Ser. No. 07/989,944 filed Dec. 10, 1992 and/which is a continuation of application Ser. No. 07/829,554 filed Feb. 5, 1992 and/which is a continuation of application Ser. No. 07/627,833 filed Dec. 17, 1990, now abandoned.

FIELD OF THE INVENTION

This invention relates to an apparatus and process for the production of high sulfur petroleum coke for use in manufacturing carbon and graphite articles, such as electric furnace electrodes, and, in particular, to an apparatus and process for treating the petroleum coke with a puffing inhibitor added to the coke during calcining in a rotary hearth calciner.

BACKGROUND OF THE INVENTION

Petroleum coke, used to produce carbon and graphite articles such as electric furnace electrodes, is calcined by heating to a temperature above 1200° C. to remove volatile components and to densify the coke. Thereafter this calcined coke is mixed with a carbonaceous binder pitch, formed into the shape of the article and carbonized by heating to a temperature above 800° C. Where graphitization is required, the article is further heated to temperatures of at least 2800° C.

Petroleum coke particles have a tendency to "puff", that is, to expand and even to split when heated to temperatures above 1500° C., if they contain more than about 0.5 percent by weight sulfur. Electrodes made from such cokes expand, lose density, lose strength, and sometimes split lengthwise when heated to these temperatures. Carbon electrodes which are not graphitized during the manufacturing process may nevertheless reach temperatures between about 2000° C. and 2500° C. during their use in silicon or phosphorus furnaces.

Puffing is associated with the release of sulfur from its bond with carbon inside of the coke particles. If the sulfur-containing vapors cannot escape from the particles or from the electrodes fast enough, they create internal pressure which increases the volume of the particle and may cause the electrode to split.

The conventional remedy for puffing has been to add iron oxide which acts as a puffing inhibitor to the coke-pitch mix before the electrodes have been formed. It has been common practice to add up to two (2) weight percent iron oxide to the mix to reduce coke puffing. Some cokes that have a higher tendency to puff or start puffing at a lower temperature cannot be controlled by iron oxide adequately for fast graphitization.

A recent improvement in the treatment of petroleum cokes to inhibit coke puffing is disclosed in U.S. Pat. No. 4,875,979, issued Oct. 24, 1989 to Orac et al., the disclosure of which is hereby incorporated by reference. This patent discloses use of the improved treatment in a horizontal rotary calciner, which treatment comprises contacting the particles of the high sulfur petroleum coke with a compound containing an alkali or alkaline earth metal selected from the group consisting of sodium, potassium, calcium and magnesium, at an elevated temperature above that at which the alkali or alkaline earth metal compounds begins to react with carbon, but below the temperature at which the coke particles would begin to puff in the absence of the compound. The coke particles and inhibitor compound are maintained at the elevated temperature for a sufficient period of time to permit the reaction to proceed and allow products of that reaction to penetrate the particles and form an alkali or alkaline earth metal containing compound throughout the mass of the particles. According to the disclosure of U.S. Pat. No. 4,875,979, the inhibitor is added to the coke particles either in a separate reactor vessel located downstream from the horizontal rotary calciner and upstream from the cooler, or in a hot zone at the inlet of the cooler especially formed by locating a circular refractory ring in the entrance portion of the cooler and moving the quench water spray nozzle downstream from the refractory ring. The so-treated coke particles are thereafter cooled in the conventional cooler used with rotary calciners.

Although the process of U.S. Pat. No. 4,875,979 is quite useful in the manner disclosed, some problems occur in attempting to adapt the treatment process to existing rotary hearth calciners which rotate about a vertical axis. Some of such existing rotary hearth calciners are equipped with indirect water sprayed coke coolers that do not have internal refractory lining and therefore cannot accommodate an internal hot reactor. If one were to attempt to apply the treatment of U.S. Pat. No. 4,875,979 to such a calciner, either the entire cooler would have to be replaced or a separate reactor vessel would have to be supplied between the discharge outlet of the rotary hearth calciner and the cooler. Both alternatives are very expensive. Another possibility would be to add the inhibitor to the raw petroleum coke entering the calcining hearth. However, the gas flowing above the hearth of the calciner could pick up part of the inhibitor and carry it away, thereby making it unavailable for reaction with the coke. This would also result in undesirable air pollution.

In view of these potential problems, it is a primary object of the present invention to provide an apparatus for treating petroleum cokes with a puffing inhibitor adapted for use in a rotary hearth calciner.

It is another object of the present invention to provide an apparatus for adding puffing inhibitor to petroleum cokes in a rotary hearth calciner which minimizes the loss of inhibitor to the waste gas stream.

It is a further object of the present invention to provide an apparatus for adding puffing inhibitor which may be easily and inexpensively retrofitted to existing rotary hearth calciners.

It is yet another object of the present invention to provide an apparatus for adding puffing inhibitor in a rotary hearth calciner which is durable yet inexpensive to operate.

SUMMARY OF THE INVENTION

The above and other objects, which will be apparent to those skilled in the art, are achieved in the present invention which is directed to a rotary hearth calciner for treating petroleum cokes with a puffing inhibitor having a hearth floor that rotates around a vertical axis for receiving particles of coke to be calcined and a central opening therein for discharging the coke into a central soaking pit. In particular, a vertical or slightly sloped feed pipe is provided which has an inlet for connection to a source of the puffing inhibitor and an outlet at or near the hearth central opening for adding the puffing inhibitor to the coke Just as the coke is discharged or dropped from the hearth floor into the central soaking pit. Preferably, the feed pipe is water cooled and its outlet is located approximately at or below the level of the hearth floor so the inhibitor is not lost to the gas flow above the hearth. More preferrably, the feed pipe outlet is near the edge of the hearth floor central opening leading to the soaking pit.

In another aspect, the present Invention is directed to a process for treating petroleum cokes with a puffing inhibitor in the type of apparatus described above in which a rotary calciner has a hearth floor that rotates around a vertical axis for receiving at Its outer periphery raw coke to be calcined and a central opening for discharging the hot calcined coke to a soaking pit. The process involves feeding raw petroleum particles onto the rotating hearth floor and heating the coke to calcining temperatures. As the coke is pushed inward and drops through the hearth central opening into the central soaking pit, the puffing inhibitor is added in the region of no or low gas flow near the hearth floor central opening to reduce loss of the inhibitor to the gas flow above the hearth. Preferably, the puffing Inhibitor is added at a point approximately at or below the level of the hearth floor. The admixed coke and puffing inhibitor are maintained in the soaking pit for a time and temperature sufficient to permit the puffing inhibitor to react with the coke particles. Such conditions are met at conventional coke residence time of approximately 30 minutes at temperatures between about 1200° C. and 1450° C. in the soaking pit. However, it has been found that temperatures as low as 750° C. are adequate to promote the required reaction between the puffing inhibitor and the coke particles.

The puffing Inhibitor most advantageously utilized is in the form of a dry, granulated powder and is preferably a compound containing an alkali or alkaline earth metal selected from the group consisting of sodium, potassium, calcium and magnesium, such as a salt of sodium or potassium, more preferably sodium or potassium carbonate.

BRIEF DESCRIPTION OF THE DRAWINGS

Figure 1:
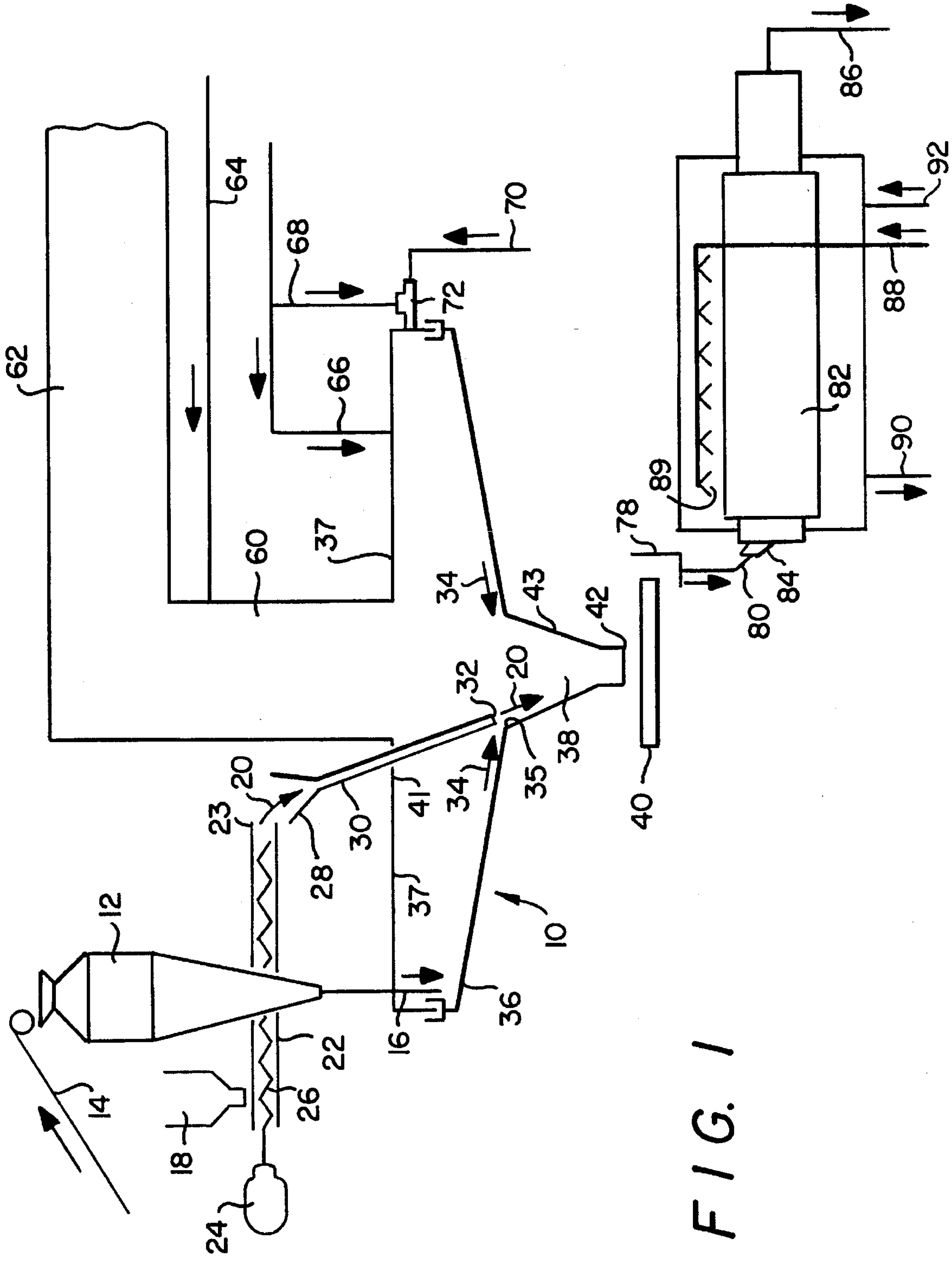
FIG. 1 is a schematic elevation view of a vertical rotary hearth calcining apparatus modified in accordance with the present invention to incorporate a feed pipe for the puffing inhibitor.
Figures 2, 3:
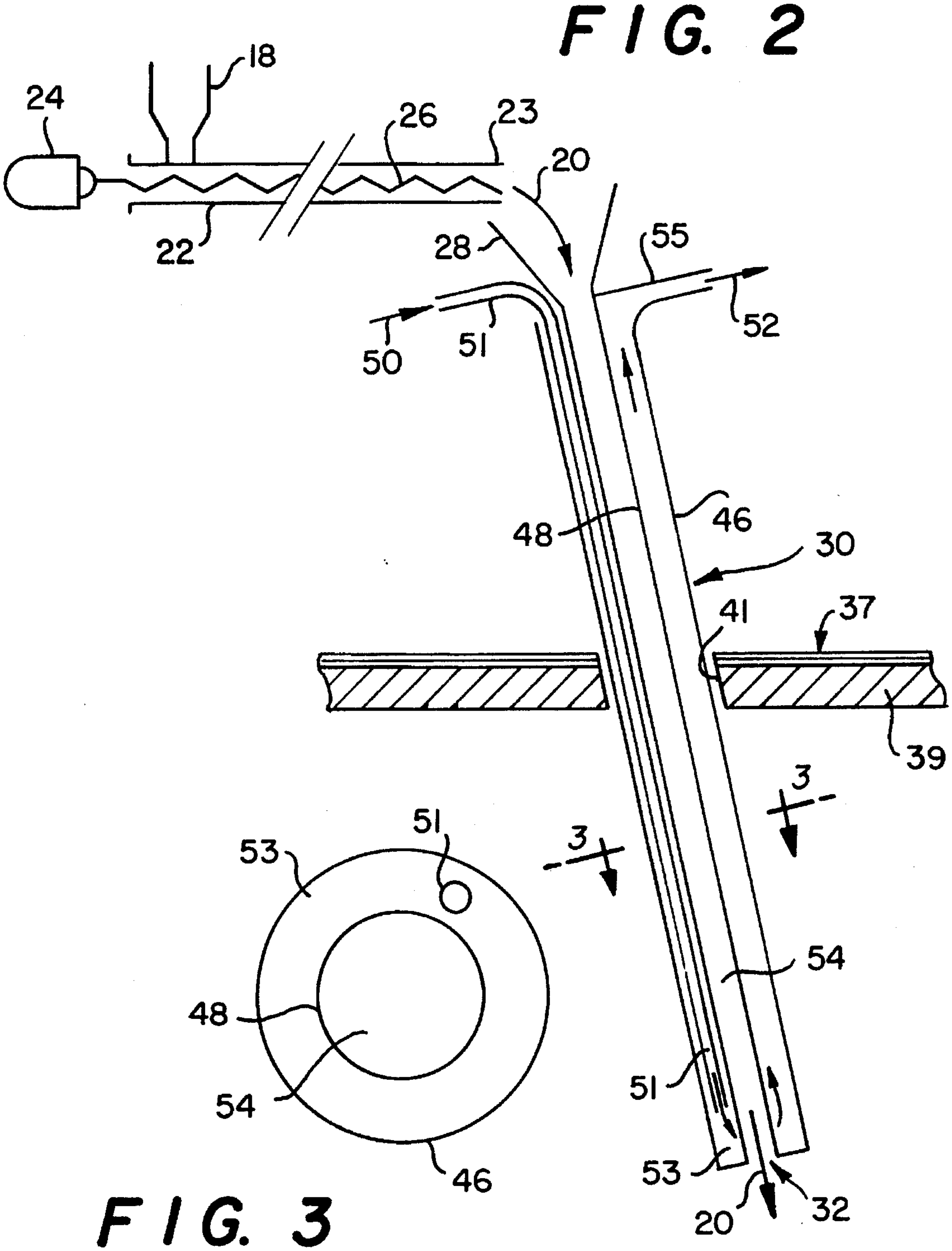
FIG. 2 is an enlarged sectional view of the feed pipe and associated supply apparatus shown in FIG. 1.
FIG. 3 is a cross sectional view of the feed pipe taken along line 3—3 in FIG. 2.

The preferred apparatus for treating petroleum cokes with a puffing inhibitor in a rotary hearth calciner is depicted in drawing FIGS. 1–3 in which like numerals refer to like features of the invention. A conventional rotary hearth calciner 10 includes a stationary roof 37 and a revolving bottom. Both the roof and bottom are refractory lined to withstand temperatures of about 1500° C. The revolving bottom is composed of a circular hearth floor or plate 36 having a central opening 35 leading to a conical central soaking pit 38. The floor 36 may be horizontal or may be slightly inwardly and downwardly sloped at an angle of approximately 10°.

A surge bin 12, fed by a conveyor 14, holds the raw or "green" coke particles which are discharged at the lower end thereof by a feed pipe or chute 16 and dropped onto floor 36 near its outer periphery. With every revolution of the calciner bottom, stationary rabbles (not shown) push the coke along the floor 36 toward the circular opening 35 of center pit 38. A horizontal discharge table 40, rotating in the direction opposite to the calciner bottom, is located below the outlet 42 of the soaking pit and controls the outflow of the hot, calcined coke from the calciner.

The heat inside the rotary hearth calciner is generated by several gas burners 72 which are supplied with fuel gas through a supply line 70 and with hot combustion air entering through supply line 68. Hot combustion air is also supplied to the calciner interior through supply line 66. The interior portion of the rotary hearth calciner 10 is heated to calcining temperatures of between about 1200° C. and about 1400° C., although the temperature may occasionally reach as high as 1500° C. Volatile combustible vapors released from the raw coke particles are also burned above hearth floor 36 inside the refractory lined calciner roof 37 which has a central opening above the soaking pit leading to the waste gas flue uptake 60. Dust incinerating air, supplied through a supply line 64, mixes with the waste gas and enters the incineration section 62 which operates at elevated temperatures of approximately 1538° C.

To avoid part of the inhibitor being carried out of the hearth by the flue gas, and to avoid an excessive residence time of the inhibitor with the coke, this invention provides that the puffing inhibitor is added at a point where the coke has been substantially calcined, but still sufficiently hot to react with the inhibitor. In order to accomplish this task, the present invention provides a particulate feed pipe 30 and associated supply apparatus for the otherwise conventional rotary hearth calciner 10 in order to add the puffing inhibitor to the discharged coke at or near the hearth floor central opening.

The inhibitor of the type disclosed in U.S. Pat. No. 4,875,979 is supplied in dry granular or particulate form from a hopper 18 which feeds the inhibitor particles through a lower outlet into a screw feeder 22 powered by an electric motor 24. The screw mechanism 26 inside feeder 22 conveys the puffing inhibitor particles at a desired rate out the exit end 23, at which point the inhibitor particles 20 drop into a funnel 28 attached to the upper, inlet end of feed pipe 30. The metering of the inhibitor is adjusted in accordance with the amount of coke entering the calciner so as to provide the proper amount desired for reaction. Feed pipe 30 extends downwardly through roof opening 41 at a slight angle from vertical with its lower, outlet end 32 positioned near the edge of hearth floor central opening 35.

The inhibitor particles 20 exit outlet 32 and are added to and admixed with the hot coke as the substantially calcined coke particles 34 are discharged inwardly through opening 35 into soaking pit 38. The feed pipe outlet may be above the hearth floor near and slightly outside opening 35 to facilitate mixing Just before the coke particles drop into the central pit. Preferably, the feed pipe outlet is approximately at or below the level of the hearth floor at or slightly within the edge of opening 35 in a region of no or low gas flow to reduce the loss of the inhibitor in the gas flow above the hearth floor 36. The vertical position of the feed pipe is adjustable so that the outlet may be extended to feed the inhibitor directly on top of the coke layer or below the surface of the coke layer. The feed pipe assembly may be removed through the calciner roof 37 for repair or replacement.

The construction of the inhibitor feed pipe 30 is shown in more detail in FIGS. 2 and 3. The feed pipe extends from the puffing inhibitor supply source above calciner 10 through opening 41 in calciner roof 37, shown lined on its lower side with refractory 39, into the calciner interior. Feed pipe 30 consists of an inner tube 48 (equipped at the upper end with funnel 28), defining a central opening or channel 54 through which the inhibitor particles drop, and a concentric outer tube 46 forming a water cooling jacket over the inner tube. The tube materials may be of any conventional materials such as steel pipe. The exterior tube 46 optionally may be covered with a refractory material as added protection against the high temperatures inside the calciner 10.

Cooling water 50 is supplied through an inlet tube 51 extending downward through annular space 53 between inner tube 46 and outer tube 48 and ending near the lower, outlet end 32 of feed pipe 30. The cooling water then flows upwardly within space 53 and around tube 48 until spent cooling water 52 exits at outlet 55 at the upper end of tube 30. The cooling water protects the structure of the feed pipe and prevents the melting of the dry, granulated inhibitor passing therethrough.

Turning back to FIG. 1, soaking pit 38 beneath the hearth floor central opening 35 has inwardly, downwardly tapering conical walls 43 which lead to lower outlet 42. In normal processing, the coke fills most of the space in soaking pit 38 and gradually slides down the inclined conical walls toward outlet 42, the rate of discharge being .controlled by rotating discharge turntable 40. Before being discharged, the inhibitor treated coke particles have a typical residence time within the soaking pit of approximately 30 minutes. The desired temperature of the coke particles in soaking pit 38 is at least 750° C. and is preferably from about 1200° C. to about 1400° C. As disclosed in U.S. Pat. No. 4,875,979, on a laboratory scale, a residence time of 30 seconds between the alkali or alkaline earth metal inhibitor compound and the coke is effective for surpression of puffing. In production, the reaction time at the aforementioned temperatures should be maintained somewhat longer, preferably for at least one minute.

The alkali or alkaline earth metal compound, for example, sodium carbonate, is added to the petroleum coke so as to mix it in amounts greater than about 0.2 percent by weight. Preferably the inhibitor is employed in amounts ranging from about 0.5 to 2.5 percent by weight of the coke. As practiced in accordance with the present invention, the dry granulated puffing inhibitor powder is mixed with the coke particles as the coke falls through the rotating hearth floor central opening into the soaking pit. When powdered sodium carbonate is employed, it melts upon contact with the hot coke particles and endothermically reacts with the coke to form elemental sodium and carbon monoxide, each in a gaseous state. The elemental sodium produced by this reaction penetrates the coke particles and is distributed throughout the mass of the coke particles creating a modified coke containing sulfur and sodium which later inhibits puffing when the coke is made into electrodes and the electrodes are heated to temperatures higher than about 1600° C.

Following reaction in soaking pit 38, the inhibitor treated coke particles are discharged from the calciner 10 onto a rotary discharge table 40 which then transfers the coke particles into a receiving bin 78 and chute 80 leading into inlet end 84 of an indirect coke cooler (FIG. 1). Such indirect coke coolers typically quench or cool the treated calcined coke particles by spraying the exterior of the cooler with water supplied through water supply line 88 and sprayed by nozzles 89. Cooling water is also supplied through inlet line 92, and spent water exits from the cooler through outlet line 90. The cooled coke particles then exit cooler 82 through outlet 86 for further processing. Such processing includes mixing the coke with a carbonaceous binder such as pitch to be shaped into an electrode form, which is thereafter baked to carbonizing temperatures (approximately 800° C.) by well known methods. Where a graphitized electrode is required, the baked electrode is further heated to graphitizing temperatures of at least about 2800° C. Thus, the present invention provides apparatus which modifies an otherwise conventional rotary hearth calciner to add puffing inhibitor in particulate form prior to discharge from the calciner at a particular location and in a manner which minimizes loss of the inhibitor in the gas flow within the calciner and which permits the reaction to take place during the normal residence time of the coke particles in the calciner soaking pit. The construction of the feed pipe itself enables it to be inexpensively yet durably produced and easily retrofitted to existing rotary hearth calciners.

While this invention has been described with reference to a specific embodiment, it will be recognized by those skilled in the art that variations are possible without departing from the spirit and scope of the invention, and that it is intended to cover all equivalents, changes and modifications of the invention disclosed herein for the purpose of illustration which does not constitute departure from the spirit and scope of the invention.

Having thus described the invention, what is claimed is:

1. A process for treating petroleum coke particles with a puffing inhibitor in a rotary hearth calciner having a hearth floor rotating around a vertical axis for receiving petroleum coke particles to be calcined and a stationary calciner cover above said hearth floor, said hearth floor having a central opening for discharging calcined petroleum coke particles into a soaking pit contiguous to and directly below said central opening in said hearth floor, said stationary calciner cover having a central opening directly above said rotating hearth floor opening, said process comprising the steps of:

a) feeding raw petroleum coke particles onto said rotating hearth floor;

b) heating said petroleum coke particles on said hearth floor to calcining temperatures of 1200°–1400° C. while rotating said hearth floor to cause (i) evolution of hot combustible gases from said petroleum coke particles which are burned above said hearth floor inside said calciner and waste gases exit the calciner through said central opening in said stationary cover and (ii) the formation of a horizontally rotating mass of substantially calcined petroleum coke particles on said rotating hearth floor;

c) causing said substantially calcined petroleum coke particles to move to said central opening in said rotating hearth floor to cause said substantially calcined petroleum coke particles to fall directly into said soaking pit at a temperature of 1200°–1400° C.;

d) adding a puffing inhibitor to said substantially calcined petroleum coke particles at a temperature of 1200°–1400° C. by introducing said puffing inhibitor near the rotating hearth floor opening above the soaking pit so that the puffing inhibitor falls into the soaking pit approximately at or below the level of said rotating hearth floor and substantially below the evolved gases from said substantially calcined petroleum coke particles to reduce loss of said inhibitor in the gas flow of evolved gases above said rotating hearth floor and continuously discharging said substantially calcined petroleum coke particles at a temperature of 1200°–1400° C. through said hearth floor into the soaking pit along with said puffing inhibitor;

e) maintaining the substantially calcined petroleum coke particles and puffing inhibitor in said soaking pit for thirty minutes at 1200°–1400° C. to permit said puffing inhibitor to react with said substantially calcined petroleum coke particles; and f) thereafter discharging inhibitor-treated coke particles from said soaking pit for cooling.

* * * * *

UNITED STATES PATENT AND TRADEMARK OFFICE
CERTIFICATE OF CORRECTION

PATENT NO. : 5,478,442

DATED : December 26, 1995

INVENTOR(S) : T.H. Orac

It is certified that error appears in the above-identified patent and that said Letters Patent is hereby corrected as shown below:

Column 3, line 48, delete "BRIEF DESCRIPTION OF THE DRAWINGS" and insert --DETAILED DESCRIPTION OF THE INVENTION--

Column 4, line 51, change "Just" to --just--

Signed and Sealed this

Eighth Day of April, 1997

Attest:

Bruce Lehman

BRUCE LEHMAN

*Attesting Officer*

*Commissioner of Patents and Trademarks*